US006862965B1

(12) United States Patent
Arias

(10) Patent No.: US 6,862,965 B1
(45) Date of Patent: Mar. 8, 2005

(54) TOOL TO REPLACE MOTOCYCLE BRAKE PADS

(76) Inventor: William Arias, 13909 SW. 90 Ave., Apt. E101, Miami, FL (US) 33176

( * ) Notice: Subject to any disclaimer, the term of this patent is extended or adjusted under 35 U.S.C. 154(b) by 0 days.

(21) Appl. No.: 10/626,752

(22) Filed: Jul. 25, 2003

(51) Int. Cl.[7] ........................... B05B 11/00; B23P 19/04
(52) U.S. Cl. ........................... 81/485; 29/239; 254/104
(58) Field of Search .............................. 81/485; 29/239, 29/253; 254/104

(56) References Cited

U.S. PATENT DOCUMENTS 4,809,567 A 3/1989 Bongard ...................... 81/485
4,903,391 A * 2/1990 Franks ........................ 29/239
5,018,261 A * 5/1991 Markous ...................... 29/239
5,269,053 A 12/1993 Hicks ...................... 29/402.01

* cited by examiner

*Primary Examiner*—Debra S. Meislin
(74) *Attorney, Agent, or Firm*—Albert Bordas; Jesus Sanchelima

(57) ABSTRACT

A tool to replace motorcycle brake pads is used for back seating disc brake pistons into their bores to make room for replacement of old brake pads with new brake pads. The tool comprises a pair of curved elongated substantially flat members wedged at one end that mount onto either side of wheel assembly discs. Once mounted and secured upon the discs, the wheel assembly is rotated in a counter-clockwise direction, causing the wedged ends to slide in between the disc brake pistons and the wheel assembly disc. This forcing the seating of disc brake pistons into their bores when the plateaued section of the tool is forced between the seating disc brake pistons and the wheel assembly disc, thus making room for the installation of new brake pads.

6 Claims, 4 Drawing Sheets

TOOL TO REPLACE MOTOCYCLE BRAKE PADS

BACKGROUND OF THE INVENTION

1. Field of the Invention

The present invention relates to tools, and more particularly, to tools used to facilitate the replacement of brake pads.

2. Description of the Related Art

Many designs for tools have been designed in the past. None of them, however, include curved elongated substantially flat members having wedged ends that mount onto discs of wheel assemblies, such as motorcycle wheel assemblies, for the replacement of brake pads.

Applicant believes that the closest reference corresponds to U.S. Pat. No. 4,809,567 issued to Bongard for Disc brake tool and kit. However, it differs from the present invention because Bongard teaches a disc brake tool and kit that is used for back seating disc brake pistons into the bores after old brake pads have been removed to make room for new brake pads. The disc brake tool includes a driven jaw with a first bearing surface and gudgeon socket, a driving jaw with second bearing surface and a centrally located threaded hole, and a threaded bolt which screws into the centrally located threaded hole and seats within the gudgeon socket to maintain the two bearing surface in parallel relation to each other. Turning the threaded bolt in one direction causes the bearing surfaces on the jaws to move away from each other thereby driving the disc brake piston back into its bore. Rotating the threaded bolt in the other direction loosens the jaws and bolts so that they can be removed from within the caliper of the disc brake. The kit further includes a U-shaped clip, which may be placed over the jaws, which are joined to form a compact container in which the threaded bolt is received for easy storage.

Applicant believes that another reference corresponds to U.S. Pat. No. 5,269,053 issued to Hicks for Compact disc brake piston retraction tool and method for retracting disc brake piston. However, it differs from the present invention because Hicks teaches a compact disc brake piston retraction tool and method for retracting a disc brake piston for moving a disc brake piston into a retracted position in the cylinder position in the cylinder bore of a disc brake caliper in order to allow the replacement of worn disc brake pads. The tool includes a threaded bolt, and a threaded collar. The bolt-collar assembly can operate alone or be attached to a brace support wall to enable it to be braced against the caliper arms, opposite the brake piston. This allows pressure to be exerted on the disc brake piston by the rotation of the collar around the threaded bolt, thereby causing the bolt-collar assembly to lengthen and exert pressure against the disc brake piston by a variety of means such as directly, by a piston bearing plate, or a brake pad attached to the brake piston. It can use a brace support wall or omit it and, can either use a piston bearing plate and/or collar journal collar end cap to transfer the pressure to the disc brake piston to force the piston back into the cylinder bore. Methods of using it are also provided.

Other patents describing the closest subject matter provide for a number of more or less complicated features that fail to solve the problem in an efficient and economical way. None of these patents suggest the novel features of the present invention.

SUMMARY OF THE INVENTION

A tool to replace vehicle brake pads, comprising a pair of curved elongated substantially flat members each wedged at one end with securing means to secure to one another when mounted onto each side of a wheel assembly. The wheel assembly has a plurality of first through-holes and the pair of curved elongated substantially flat members are used to cammingly displace disc brake pistons into their respective bores to make room for replacement of old brake pads with new brake pads.

The securing means includes the pair of curved elongated substantially flat members each having a plurality of second through-holes that align with the first through-holes and a securing device attaching through the first through-holes and second-through-holes. The pair of curved elongated substantially flat members each has first and second faces and first and second ends. The first faces are substantially flush and face the each side of the wheel assembly when mounted upon. Each of the second faces has a wedge section extending a predetermined distance from the first ends towards the second ends without reaching the second ends.

The pair of curved elongated substantially flat members are mounted onto the wheel assembly and the wheel assembly is rotated so that the wedge section slides in between the disc brake pistons and the wheel assembly to cammingly displace the disc brake pistons into their respective bores with the second faces.

The wheel assembly is of an automobile, motorcycle, truck, tractor, or trailer, or other vehicle having a similar braking system. The wheel assembly may be a disc.

It is therefore one of the main objects of the present invention to provide a tool to replace motorcycle brake pads for back seating disc brake pistons into their bores without having to remove the front or rear wheel assembly.

It is another object of this invention to provide a tool to replace motorcycle brake pads that mounts onto the disc of a motorcycle wheel assembly.

It is another object of this invention to provide a tool to replace motorcycle brake pads without bending or warping front or rear wheel assemblies.

It is another object of the present invention to provide a tool to replace motorcycle brake pads that comprises a pair of curved elongated substantially flat members wedged at one end that mount onto either side of wheel assembly discs.

It is still another object of the present invention to provide a tool to replace motorcycle brake pads that slide in between disc brake pistons and the motorcycle disc, forcing the disc brake pistons into their bores.

It is still another object of the present invention to provide a tool to replace motorcycle brake pads without having to bleed the vehicle's brake line system.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
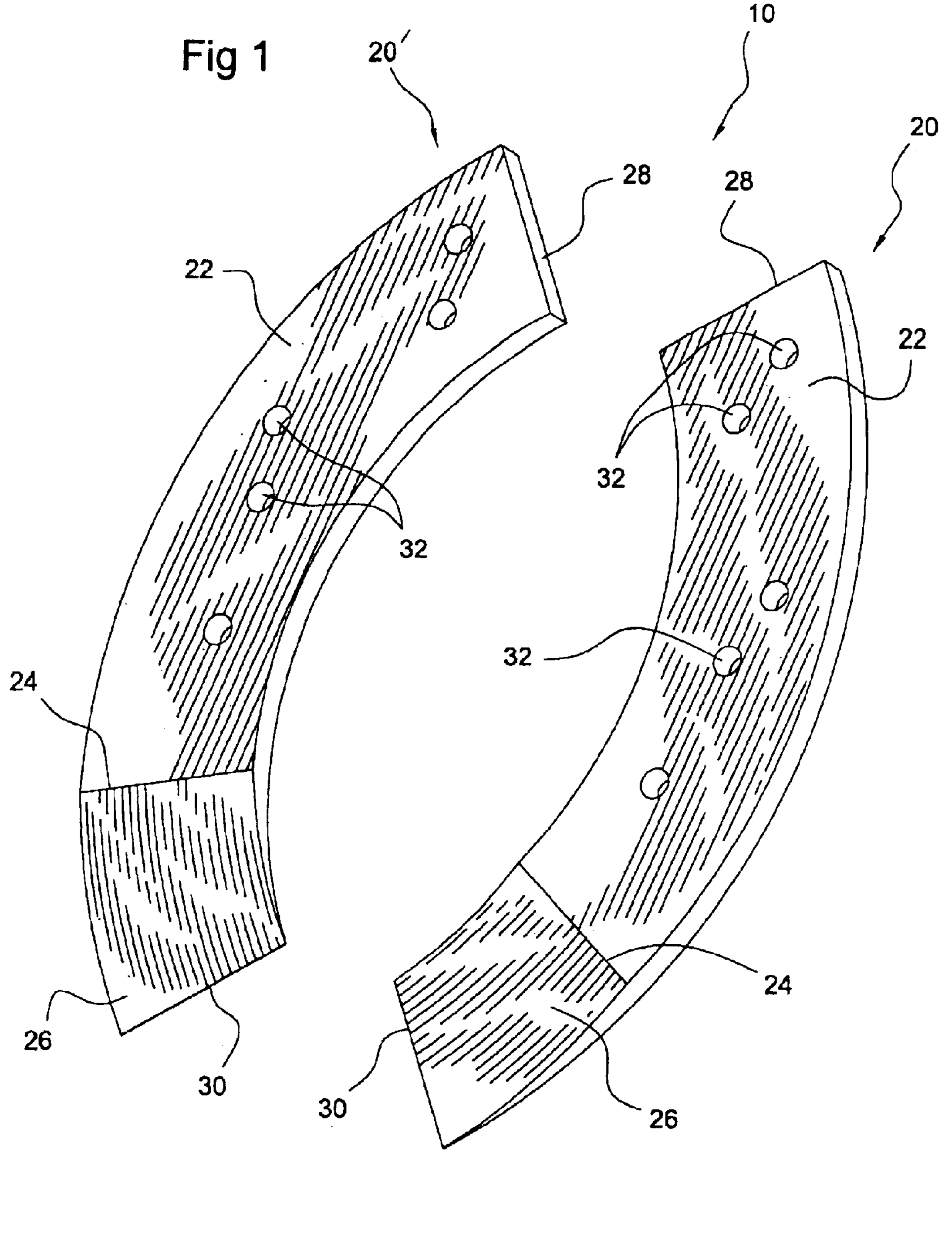
FIG. 1 represents a perspective view of the present invention.

Referring now to the drawings, where the present invention is generally referred to with numeral 10, it can be observed that it basically includes right elongated member 20 and left elongated member 20'. Right elongated member 20 is a mirror image of left elongated member 20'. Right elongated member 20 is mounted onto the right face of a wheel assembly disc and left elongated member 20' is mounted onto the left face of the wheel assembly disc. In the preferred embodiment, the wheel assembly is of a "Harley Davidson" motorcycle. However, the motorcycle may be any vehicle so long as the vehicle rim/disc has holes, such as holes 114 seen in FIGS. 3 and 4, for the instant invention to mount upon.

As seen in FIG. 1, right elongated member 20 and left elongated member 20' have cooperative characteristics to mount and be secured upon vehicle discs. Right elongated member 20 and left elongated member 20' are substantially flat; having plateaued section 22 that extends from end 28 to ridge 24. Extending from ridge 24 is wedge 26 that terminates at edge 30. Holes 32 are through-holes traspassing right elongated member 20 and left elongated member 20'.

Figure 2:
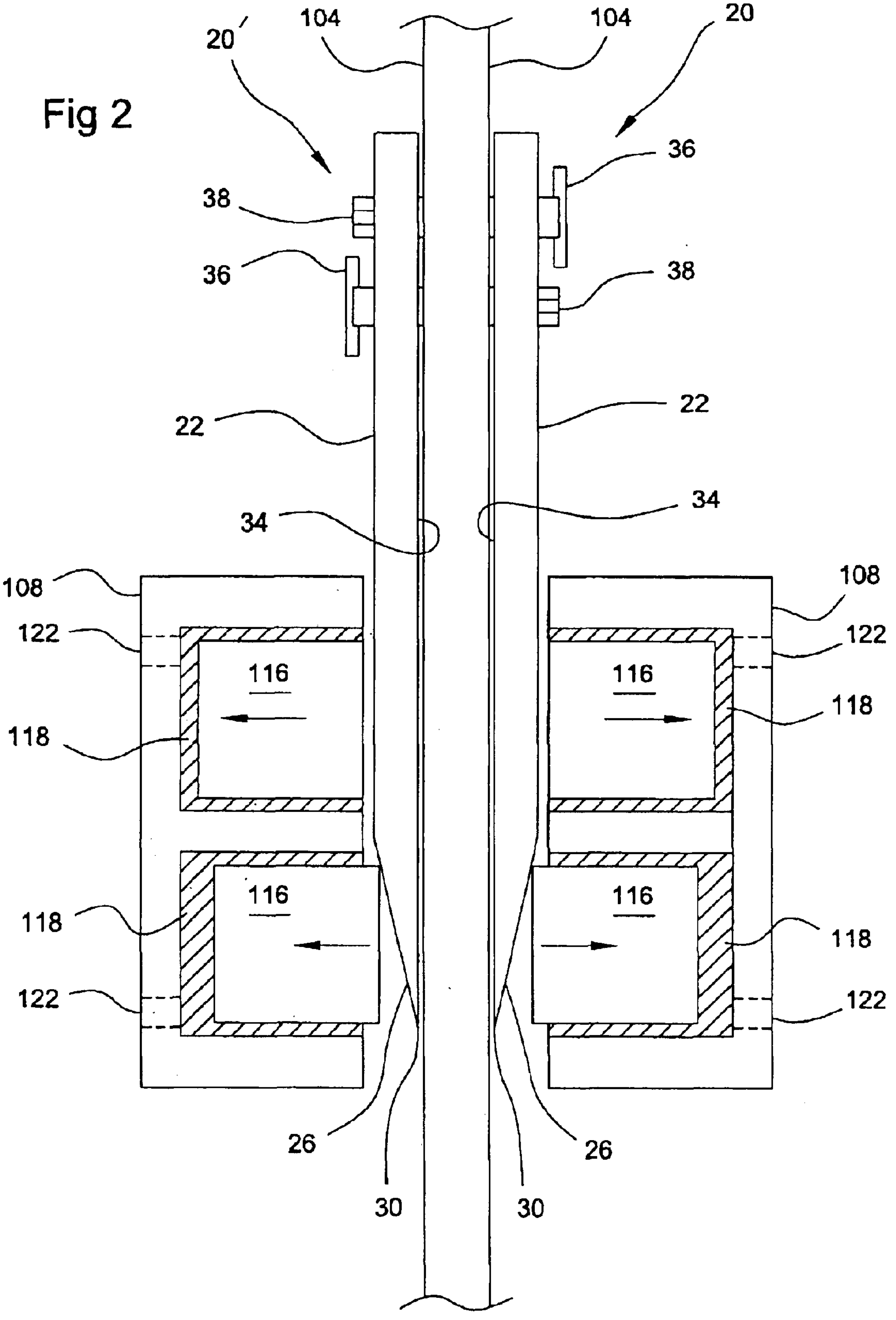
FIG. 2 shows a top view of the instant invention mounted onto the disc of a wheel assembly and back seating disc brake pistons into their bores.
Figure 3:
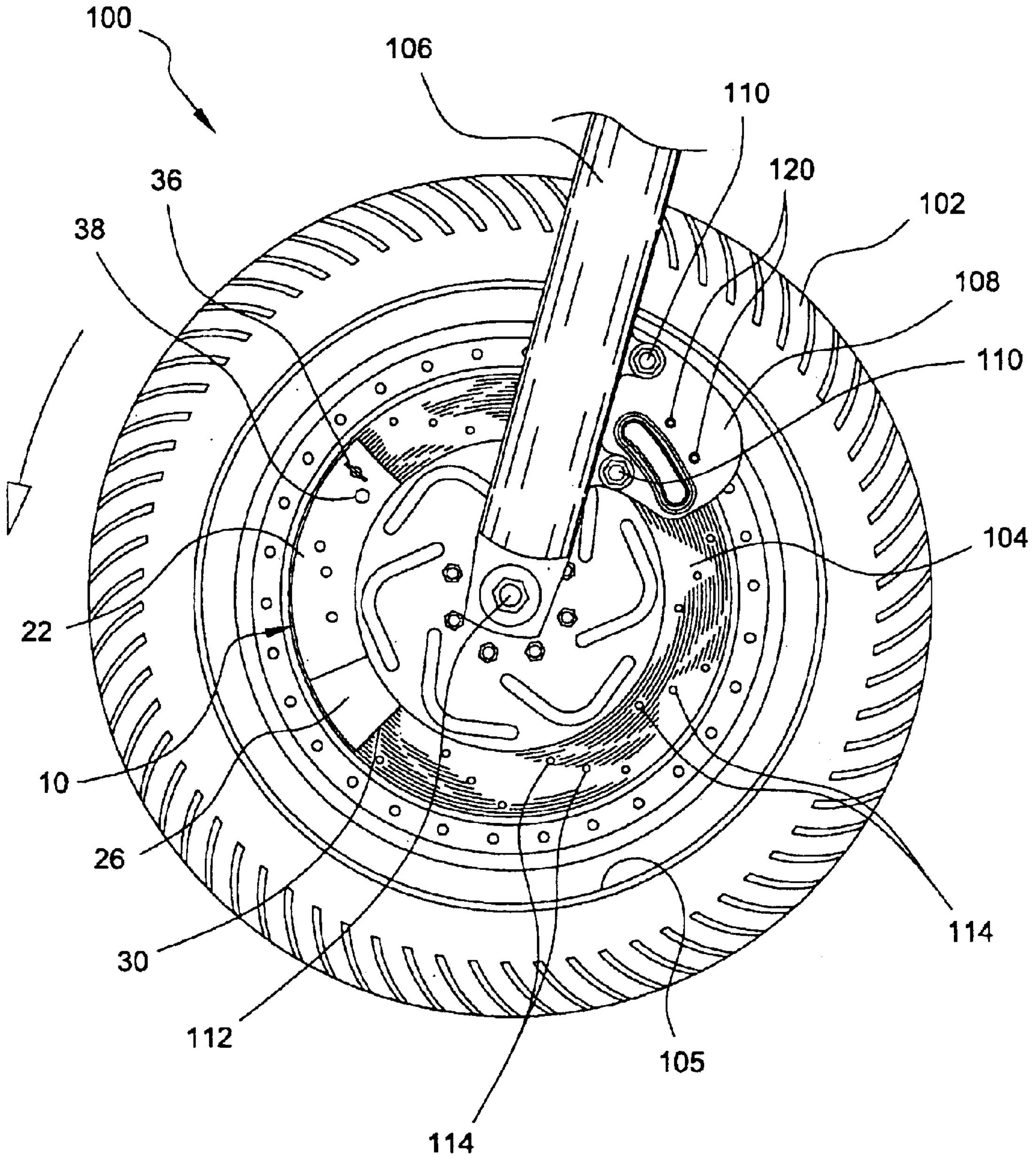
FIG. 3 illustrates a left side view of the instant invention mounted onto a motorcycle disc.
Figure 4:
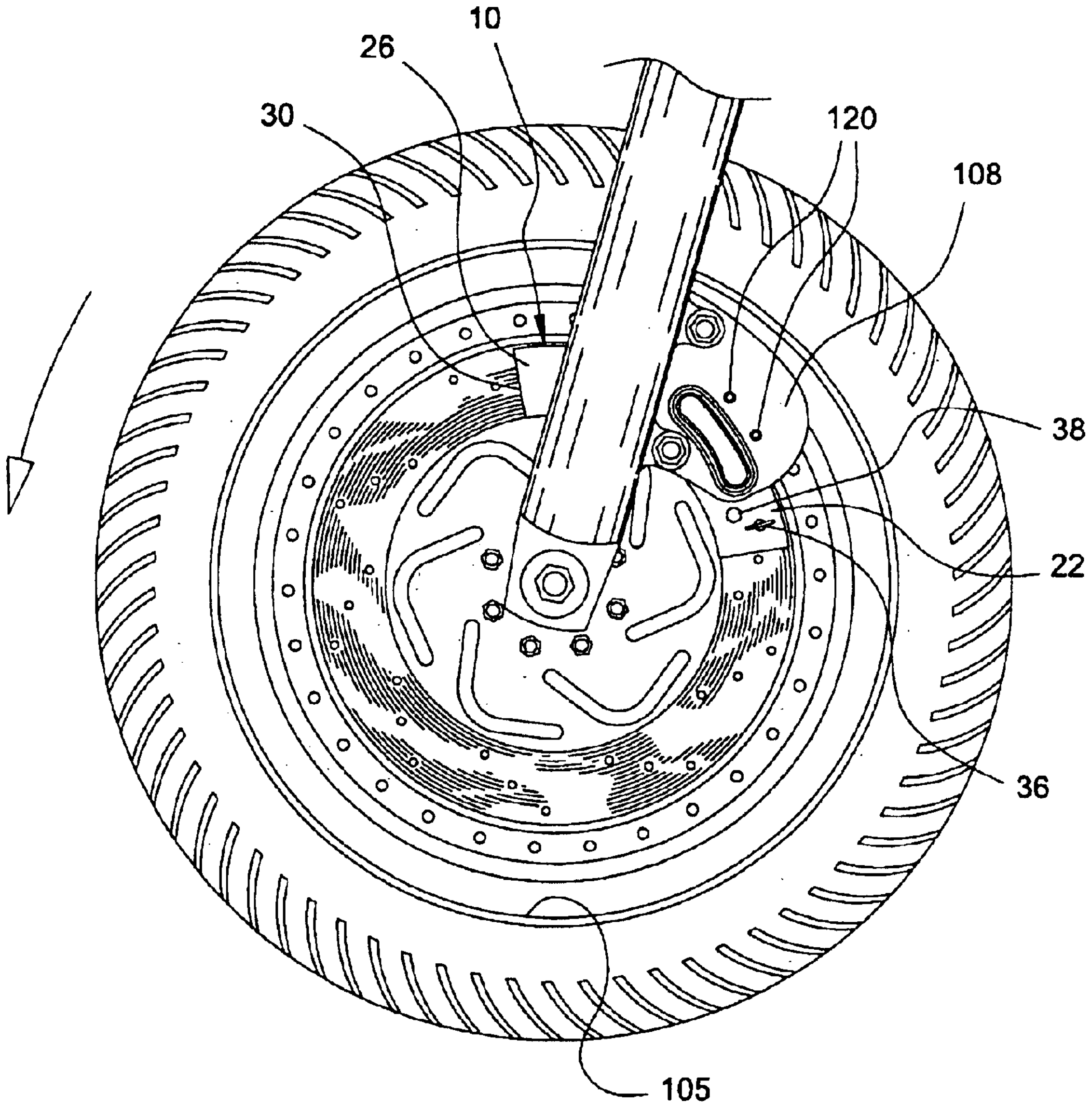
FIG. 4 is a representation of the instant invention having back seated the disc brake pistons into their bores after wheel assembly 100 has rotated in a counter-clockwise direction from the position seen in FIG. 3, forcing the instant invention to slide in between the disc brake pads 116 and the motorcycle disc 104.

As seen in FIG. 2, right elongated member 20 and left elongated member 20' are mounted and secured upon disc 104 of wheel assembly 100, seen in FIGS. 3 and 4. In the preferred embodiment, right elongated member 20 and left elongated member 20' are bolted to each other with disc 104 in between them, as shown in the illustrated figure. When mounted and secured upon disc 104, holes 32 of right elongated member 20 and left elongated member 20' align with holes 114. Flush section 34 faces each face of disc 104 and in the preferred embodiment, the gap between each flush section 34 and disc 104 is as small as possible. Wing bolts 36 and nuts 38 may be utilized as a securing device to attach right elongated member 20 and left elongated member 20' to each other with disc 104 in between.

As seen in the illustrated embodiment, brake caliper 108 comprises pistons 116 and their respected bores 118. As shown, wedges 26 cause pistons 116 to back scat into their respective bores 118 as right elongated member 20 and left elongated member 20' pass between disc 104 and pistons 116. Once pistons 116 are set back into their respective bores 118, there is room for the replacement of the old brake pads, not seen. Also seen in FIG. 2, are holes 122 to receive brake pins 120.

Seen in FIG. 3 is a motorcycle wheel assembly and strut. Wheel assembly 100 comprises tire 102 mounted onto rim 105. Disc 104 is secured onto rim 105 and is mounted onto strut 106 by pin 112. Also secured to strut 106 is brake caliper 108. Brake caliper 108 is attached onto strut 106 with end nuts 110. As seen in this illustration, left elongated member 20' is secured onto the left face of disc 104, not shown is right elongated member 20 secured onto the right face of disc 104. In the preferred embodiment, both left elongated member 20' and right elongated member 20 are secured onto disc 104. This ensures that equal force will be applied to pistons 116 when wedge 26 is forced against them. The instant invention, as seen in the illustrated figure, has been mounted and secured upon disc 104, and is in position to be utilized.

As seen in FIG. 4, wheel assembly 100 has been rotated in a counter-clockwise direction forcing instant invention 10 within brake caliper 108, thus forcing pistons 116 to back seat into their respective bores 118, as seen in FIG. 2. Once pistons 116 are set back into their respective bores 118 there is room for the replacement of the old brake pads, not seen.

In operation, left elongated member 20' is secured onto the left face of disc 104 and right elongated member 20 is secured onto the right face of disc 104, only the left side is seen in FIGS. 3 and 4. Brake pins 120 are removed from brake calipers 108. The removal of brake pins 120 will sometimes cause brake pads, not seen, to slide or fall out completely of brake caliper 108.

In the preferred embodiment, wheel assembly 100 is rotated in a counter-clockwise direction so that edge 30 meets pistons 116 in brake caliper 108, seen in FIG. 2. Instant invention 10 will cause the brake pads, not seen, to slide completely from brake caliper 108, as wheel assembly 100 rotates, in the event they had not slid or fallen out when brake pins 120 were previously removed. Wheel assembly 100 continues to be rotated until nut 38 or wing bolt 36 approaches brake caliper 108 as seen in FIG. 4. With the length of plateaued sections 22, it is clear to see that wedge 26 has cleared the length of brake caliper 108. In the illustrated position, plateaued sections 22 have forced pistons 116 to sit back into their respective bores 118, as seen in FIG. 2. Once in the illustrated position, wheel assembly 100 is rotated in a clockwise direction, clearing the area for the installation of new brake pads, not seen.

In the preferred embodiment, left elongated member 20' and right elongated member 20 are approximately 0.317 inches in thickness from plateaued section 22 to flush section 34. However, thickness of left elongated member 20' and right elongated member 20 may vary according to brake pad thickness and brake caliper tolerances. In some cases left elongated member 20' and right elongated member 20 thickness may range from 0.001 to 10.0 inches and even more, depending on the equipment it is used for, such as but not limited to, automobiles, buses, tractors, and other vehicles having similar brake pad systems. Left elongated member 20' and right elongated member 20 can also vary in length, depending on the number of pistons in the brake caliper.

In addition, the instant invention typically applies even pressure on each side of the wheel assembly disc, since instant invention 10 mounts on each side of the wheel assembly disc, preventing bending or warping of the wheel assembly disc.

The instant invention may be utilized to safely replace old vehicle brake pads without opening the brake line system. Therefore, it is not necessary to bleed the brake line system. Furthermore, the instant invention may be used to replace brake pads on front or rear wheel assemblies.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A tool to replace vehicle brake pads, comprising a pair of curved elongated substantially flat members each wedged at one end with securing means to secure to one another when mounted onto each side of a wheel assembly, said wheel assembly having a plurality of first through-holes, said pair of curved elongated substantially flat members used for cammingly displacing disc brake pistons into their respective bores to make room for replacement of old brake pads with new brake pads.

2. The tool to replace vehicle brake pads set forth in claim 1, further characterized in that said securing means includes said pair of curved elongated substantially flat members each having a plurality of second through-holes that align with said first through-holes and a securing device attaching through said first through-holes and second-through-holes.

3. The tool to replace vehicle brake pads set forth in claim 2, further characterized in that said pair of curved elongated substantially flat members each have first and second faces and first and second ends, said first faces substantially flush and face said each side of said wheel assembly when mounted upon, each of said second faces having a wedge section extending a predetermined distance from said first ends towards said second ends without reaching said second ends.

4. The tool to replace vehicle brake pads set forth in claim 3, further characterized in that when said pair of curved elongated substantially flat members are mounted onto said wheel assembly, said wheel assembly is rotated so said wedge section slides in between said disc brake pistons and said wheel assembly to cammingly displace said disc brake pistons into their said respective bores with said second faces.

5. The tool to replace vehicle brake pads set forth in claim 4, further characterized in that said wheel assembly is of an automobile, motorcycle, truck, tractor, or trailer.

6. The tool to replace vehicle brake pads set forth in claim 5, further characterized in that said wheel assembly is a disc.

* * * * *